United States Patent [19]

Morgan

[11] Patent Number: 4,475,853
[45] Date of Patent: Oct. 9, 1984

[54] ROTARY TOOL AND GUIDE

[75] Inventor: Thomas J. Morgan, Silvis, Ill.

[73] Assignee: Deere & Company, Moline, Ill.

[21] Appl. No.: 454,785

[22] Filed: Dec. 30, 1982

[51] Int. Cl.³ .......................... B23C 5/28; B23B 51/06
[52] U.S. Cl. ..................................... 409/137; 408/56;
408/57; 408/72 R; 408/97; 408/115 B
[58] Field of Search .................... 409/137; 408/56, 59,
408/57, 61, 72 B, 97, 115 R, 115 B

[56] References Cited

U.S. PATENT DOCUMENTS

| 2,552,463 | 5/1951 | Searles | 408/56 |
|---|---|---|---|
| 3,120,766 | 2/1964 | Zagar | 408/56 |
| 3,214,774 | 11/1965 | Gulland | 408/56 X |
| 3,540,323 | 11/1970 | Rishel | 408/223 X |
| 3,874,808 | 4/1975 | Zaccardelli et al. | 408/115 B |
| 4,053,249 | 10/1977 | Ness et al. | 408/57 X |
| 4,124,328 | 11/1978 | Hopkins | 408/223 |
| 4,130,372 | 12/1978 | Vugrin | 408/72 |
| 4,149,821 | 4/1979 | Faber | 408/199 |
| 4,194,862 | 3/1980 | Zweekly | 408/224 |
| 4,220,429 | 9/1980 | Powers | 408/57 X |

FOREIGN PATENT DOCUMENTS

| 85354 | 8/1983 | European Pat. Off. | 408/56 |
|---|---|---|---|
| 3109543 | 1/1982 | Fed. Rep. of Germany | 409/137 |
| 999975 | 7/1965 | United Kingdom | 409/137 |

Primary Examiner—William R. Briggs

[57] ABSTRACT

Drill structure including an improved drill with indexable inserts, the drill including a straight fluted end with increased chip clearance and decreased clearance between the outer periphery of the end and the bore surface for reduced chip binding. The drill includes a grooved barrel which is received in a bushing fixed with respect to the workpiece to prevent wobble and to precisely locate the bore.

10 Claims, 6 Drawing Figures

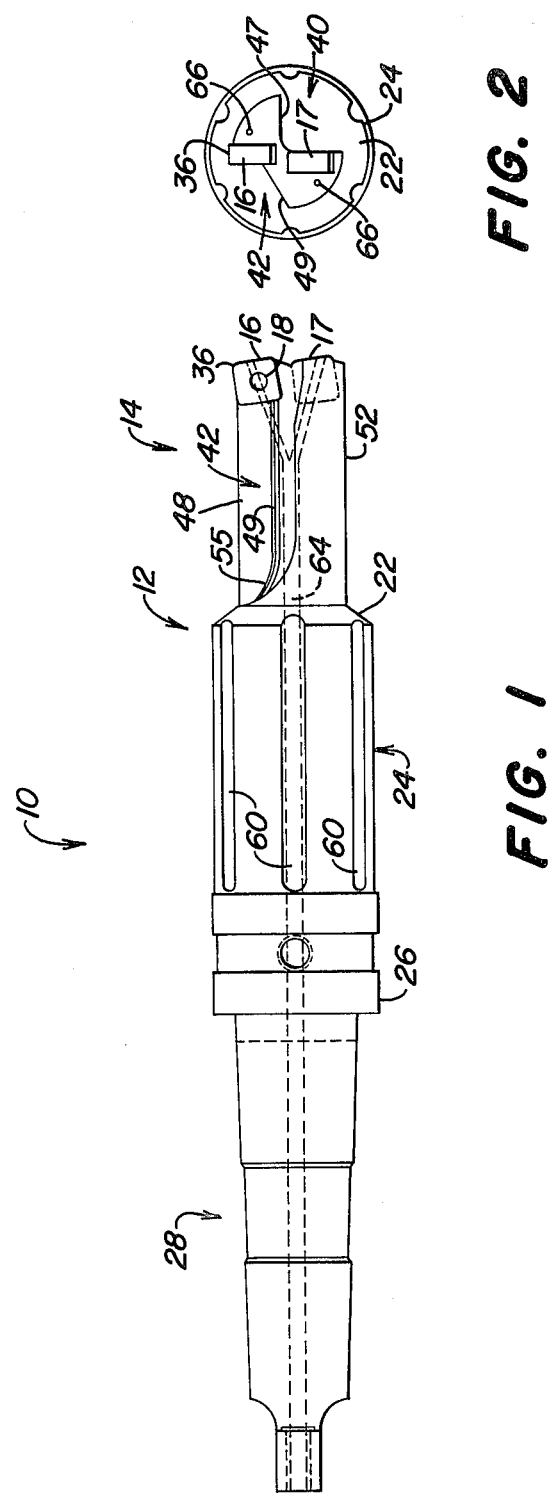

ROTARY TOOL AND GUIDE

BACKGROUND OF THE INVENTION

This invention relates generally to a drill and more specifically to improvements in a drill having indexable cutting inserts. The drill is of the type shown in U.S. Pat. No. 3,963,365.

Previously available drills of the aforementioned type include indexable inserts to increase the useful life of the drill. The drill commonly is equipped with wear strips to guide the drill for axial movement in substantially a straight line and to prevent the steel body from rubbing against and being worn by the wall of the hole being drilled. In U.S. Pat. No. 4,149,821, such wear strips are eliminated by offsetting the inserts at a particular angular relationship to radially balance the drill.

Drills of the type discussed in the aforementioned U.S. Patents often experience a relatively short service life when drilling hard metals, as metal chips become lodged between the outermost periphery of the drill and the inside of the bore, particularly when the drill is rotated about an upright axis. As friction heats the drill to red-hot temperatures, the chip binding problem becomes more acute. The individual drills are expensive, and the incidences of early drill failure significantly increase the average fabricating cost of a workpiece

SUMMARY OF THE INVENTION

It is therefore a general object of the present invention to provide an improved indexable drill. It is a further object to provide such a drill which is highly stabilized in the direction of feed and which provides improved chip removal.

It is still another object of the invention to provide such a drill which has improved chip flow characteristics and which is not subject to frequent binding in the bore caused by chips lodging between the periphery of the drill and the bore surface. It is another object to provide such a drill wherein such binding is reduced even when the drill is rotated about a vertical axis.

It is a further object of the invention to provide a drill of the aforementioned type which is stabilized in the axial direction so as not to require wear strips or modification of the angular relationship between the inserts. It is yet another object to provide such a drill which can accurately locate and start a hole without requiring a pilot hole.

It is a further object of the invention to provide an indexable drill which obviates very rigid spindles to stabilize the tool during drilling.

It is still a further object of the invention to provide a drill which accommodates high drill rates on conventional machines, better tool life and a reduction of the need for sharpening.

In accordance with the above objects the drill of the present invention has a straight fluted end with increased chip clearance. The chip removal recesses have substantially axial planar surfaces rather than inclined surfaces adjacent the inserts to thereby cause the chips to flow axially rearwardly with less tendency to lodge between the drill and the surface of the bore. The chips flow rearwardly until they contact a rearward portion of the flute where they are directed outwardly above the bore. The chip clearance and flute construction, and a decreased clearance between the outer periphery of the drill and the bore surface, prevent the chips from lodging between the surfaces of the drill and the bore. A grooved barrel adjacent the fluted end is received in a bushing which is part of the drill fixture. The bushing steadys the drill to eliminate need for wear strips. The bushing also permits the drill to be used on a less rigid machine spindle or head than would normally be necessary with a conventional tool. The fluted area is substantially straight and non-flared and tapers outwardly toward the grooved barrel so that the tool can be quickly and easily removed from the fixture. The tool lifetime is increased many times over that of a conventional drill with indexable inserts.

These and other objects, features and advantages of the present invention will become apparent to those skilled in the art from the description which follows and from the drawings.

BRIEF DESCRIPTION OF THE DRAWINGS

FIG. 1 is a side view of a drill constructed in accordance with the present invention.

FIG. 2 is an end view of the drill of FIG. 1.

DESCRIPTION OF THE PREFERRED EMBODIMENT

Figure 4:
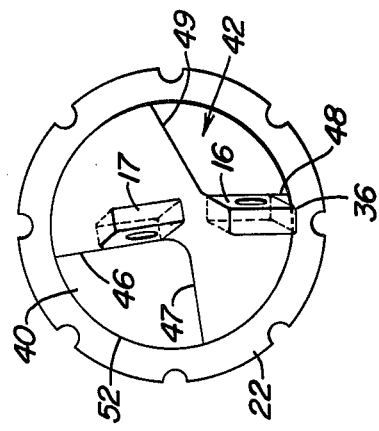
FIG. 4 is an end view taken along lines 4—4 of FIG. 3.

Referring now to FIG. 1, therein is shown an indexable drill 10 having a shank 12 and a straight fluted cutting end 14 with carbide inserts 16 and 17 fixed to the shank by screws 18 or other suitable conventional means.

The shank 12 tapers outwardlly from the straight fluted end 14 at approximately a 35 degree angle at 22 to a grooved body portion 24 having a diameter greater than that described by the outermost edge of the outermost insert 18. A conventional coolant collar 26 encircles the shank axially rearwardly of the grooved body portion 24. The axially rearwardmost portion of the shank 12 tapers radially inwardly at end or Morse taper 28.

Figure 3:
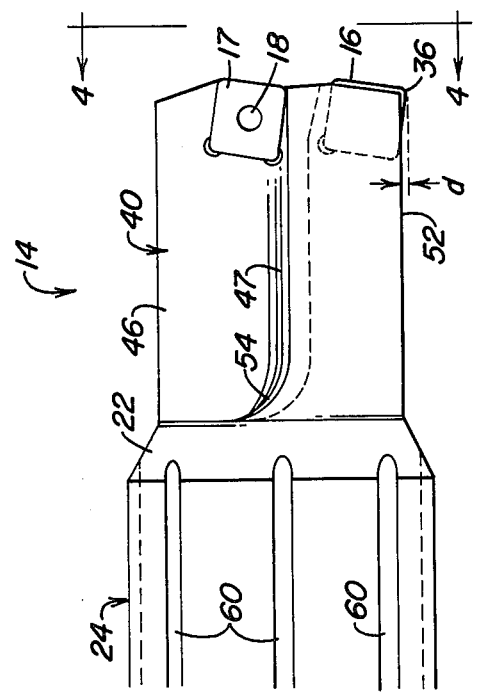
FIG. 3 is an enlarged view of the fluted end portion of the drill of the present invention.

The inserts 16 and 17, and the support structure in the fluted end 14 for the inserts are of conventional design, such as set forth in the aforementioned U.S. Pat. No 3,963,365, and so will not be described in further detail here. However, the outermost carbide insert 16 is supported in the end 14 so that the radially outermost cutting point 36 projects only slightly outwardly of the outermost surface of the fluted end 14. This distance of projection, represented by d in FIG. 3, is less than 0.005 inch and preferably is 0.004 inch. The dimension d is sufficient to prevent the fluted end from rubbing against the surface of the bore, and yet is small enough so that chips will not enter and lodge between the surface of the bore and the surface of the fluted end 14.

The fluted end 14 is constructed to provide increased chip clearance and improved chip flow to prevent binding. The fluted end 14 includes chip removal recesses indicated generally at 40 and 42 associated with the carbide inserts 17 and 16, respectively. The recesses 40 and 42 extend generally axially rearwardly from the respective insert locations and are characterized by straight wall portions 46, 47 and 48, 49, all of which lie substantially along planes which are parallel to the axis of rotation of the drill. The straight walls 46, 47 and 48, 49 extending rearwardly from the respective inserts 17 and 16 reduce the tendency for the chips cut from the workpiece to angle toward periphery 52 of the fluted end 14. Instead, the chips are directed more in the axially rearwardly direction to reduce the possibility of binding between the periphery 52 and the wall of the bore. The chip removal recesses 40 and 42 taper outwardly toward the angle 22 at locations 54 and 55 (FIGS. 1 and 3) to direct chips outwardly from the bore. The tapers 54 and 55 are located a distance at least equal to the maximum depth of penetration of the drill 10 to permit free exit of the chips from the workpiece as the bore is being formed.

The grooved body portion 24 has a generally cylindrical surface of radius greater than the radius of the straight fluted end 14. A plurality of longitudinally extending grooves 60 are equally spaced around the periphery of the cylinder to permit cooling and lubricating fluid to flow axially toward the end 14. Six grooves 60 are shown in FIGS. 1 and 2 but more (FIGS. 3-6) or less may be provided depending on cooling and lubricating requirements. A conventional cooling fluid path 64 is formed within the drill 10 and communicates with the coolant collar 26. The coolant path 64 extends axially forwardly from the collar 26 to openings 66 (FIG. 2) adjacent the carbide inserts 16 and 17.

Figure 5:
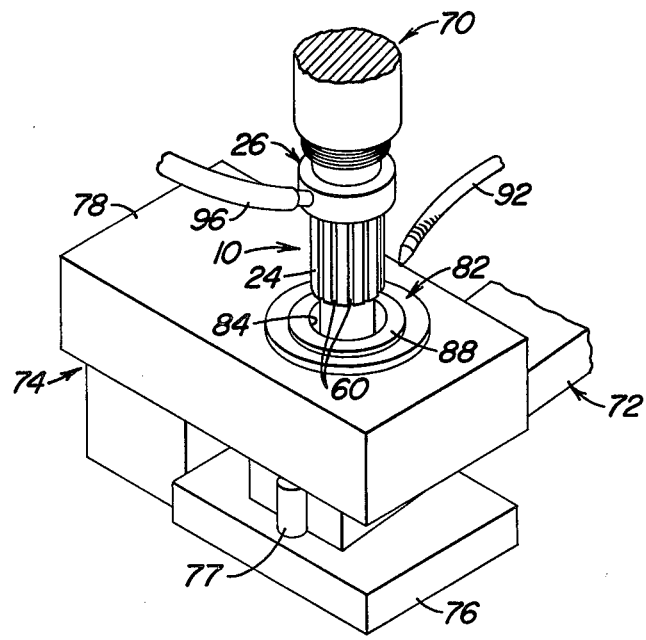
FIG. 5 is a perspective view of the drill of FIG. 1 in its operating position in a drill assembly.
Figure 6:
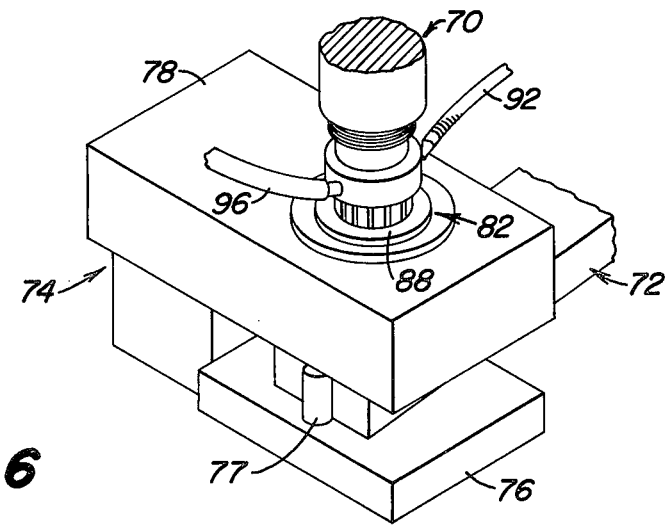
FIG. 6 is a view similar to FIG. 5 but with the drill advanced through the workpiece.

The Morse taper 28 is adapted for insertion into a conventional chuck assembly, such as shown at 70 in FIG. 5. In the preferred embodiment the workpiece to be drilled, indicated generally at 72, is rigidly supported in a fixture 74. The fixture 74 includes a lower base portion 76 having locating structure 77 for positioning the workpiece 72 in the proper location relative to the fixture 74. A bearing support block 78 is fixed securely with respect to the base portion 76 and is offset above the base portion to permit the workpiece 72 to be positioned therebetween. A drill guide bearing 82 is located in the support block 78 for axially receiving the grooved body portion 24. The diameter of guide bearing opening 84 is approximately equal to but slightly greater than the diameter of the grooved body portion 24 so that the drill can move axially within the bearing during the drilling operation. The bearing 82 provides lateral stability for the drill with respect to the workpiece 72 for precisely locating the bore without drilling a pilot hole in the workpiece and for preventing wobble that would result in an irregular bore. In the preferred embodiment the guide bearing 82 is a solid drill bushing within which the grooved body portion 24 rotates. Alternatively, the guide bearing 82 is a needle bearing having an inner sleeve 88 which rotates with the drill 10 to reduce friction between the drill and the fixture 74. A fixed bearing 82 provides slightly less wobble of the end 14 with respect to the workpiece 72. In the preferred embodiment, the difference between the inner diameter of the fixed bushing and the outer diameter of the grooved body portion 24 is less than 0.010 inch to prevent any substantial wobble. A difference of 0.008 inch has been found to work satisfactorily. A conduit 92 located adjacent the drill 10 provides a continuous supply of water and/or grease which flows downwardly through the grooves 60 to cool the drill 10 and to provide lubrication for the guide bearing 82, particularly when the bearing is a fixed rather than floating type.

The workpiece 72 is tightly secured with respect to the fixture 74 by the locating structure 77 as well as conventional clamping structure (not shown). The drill 10 is rotated at a suitable rate of speed, preferably about 700 rpm, and fluid is directed through the conduit 92 unto the grooved body portion 24. Fluid also is directed through a conduit 96 to the coolant collar 26 to the tip of the drill via the coolant path 64. The drill is advanced axially with respect to the fixture 74 and the workpiece 72 while being guided by the bearing 82 to a precise location on the workpiece 72. The end 14 is advanced through the workpiece 72 as chips cut by the carbide inserts 16 and 17 are directed upwardly through the staight walled chip removal recesses 40 and 42 and out the upper portion of the fluted end 14.

Having described the preferred embodiment, it will be apparent that modifications can be made without departing from the scope of the invention as defined in the accompanying claims.

I claim:

1. A drill adapted for insertion into a rotatable chuck for forming a bore of a preselected depth in a hard metal workpiece, said drill comprising:

a straight fluted end having a generally cylindrical surface with a plurality of chip removal recesses provided axially therealong, at least one hardened cutting insert located at the axially forwardmost portion of each chip removal recess, wherein said chip removal recesses have substantially straight sidewall portions extending axially rearwardly from the respective inserts, said sidewalls lying substantially along planes parallel to the axis of rotation of the fluted end, a chip removal area tapering radially outwardly from at least one of the sidewalls at a distance from the axially forwardmost end of the fluted end at least equal to the depth of penetration of the drill, a grooved body portion having a generally cylindrical surface the radius of which is greater than the radius of the straight fluted end, said grooved body portion including a plurality of grooves extending axially along said portion, wherein said grooved body portion is adapted for insertion into a bearing positionally secured with respect to the workpiece to be drilled, and wherein said axially extending grooves provide a coolant and lubricant fluid path axially from the axially rearward portion of the drill to the straight fluted end portion.

2. The invention as set forth in claim 1 wherein one of the hardened cutting inserts defines an outermost cutting point projecting radially outwardly of the cylindrical surface, and wherein the distance of projection of said point from the surface is on the order of 0.004 inch.

3. The invention as set forth in claim 1 wherein the grooved body portion is adapted for insertion into a non-rotatable bushing for movement axially therethrough and rotation therein.

4. A drill structure including a drill adapted for insertion into a rotatable chuck for forming a bore of a preselected depth in a hard metal workpiece, said drill structure comprising:

said drill including a straight fluted end having a generally cylindrical surface with a plurality of chip removal recesses provided axially therealong, at least one hardened cutting insert located at the axially forwardmost portion of each chip removal recess, wherein said chip removal recesses have substantially straight sidewall portions extending axially rearwardly from the respective inserts, said sidewalls lying substantially along planes parallel to the axis of rotation of the fluted end, a chip removal area tapering radially outwardly from at least one of the sidewalls at a distance from the axially forwardmost end of the fluted end at least equal to the depth of penetration of the drill, and a grooved body portion having a generally cylindrical surface the radius of which is greater than the radius of the straight fluted end, said grooved body portion including a plurality of grooves extending axially along said portion; and a fixture for securing the workpiece with respect to the axis of rotation, said fixture including positioning means for securing the workpiece in a preselected position, a bearing support fixed with respect to the positioning means, and bearing means located in the bearing support and rotatably receiving the grooved body portion for rotation therein, said bearing means providing axial stability to the drill for preventing wobble of the drill with respect to the workpiece.

5. The invention as set forth in claim 4 further comprising fluid means for directing fluid unto the grooved body portion and causing the fluid to flow through the grooves toward the fluted end.

6. The invention as set forth in claim 4 wherein the bearing means comprises a fixed bushing having an inner diameter approximately equal to but slightly greater than the diameter of the grooved portion, said grooved portion being axially advanceable through the fixed bushing.

7. The invention as set forth in claim 6 including lubricating means for providing a flow of lubricating fluid to the grooves to reduce friction between the grooved body portion and the bushing.

8. The invention as set forth in claim 4 wherein said bearing means comprises a needle bearing.

9. The invention as set forth in claim 6 wherein the inner diameter of the bushing is less than 0.010 inch greater than the diameter of the grooved portion.

10. The invention as set forth in claim 4 wherein one of the hardened cutting inserts defines an outermost cutting point projecting radially outwardly of the cylindrical surface, and wherein the distance of projection of said point from the surface is on the order of 0.004 inch.

* * * * *